United States Patent Office 3,202,520
Patented Aug. 24, 1965

3,202,520
CONCRETE CEMENT COMPOSITION
Charles R. Enoch, King of Prussia, Pa., assignor to Resco Products, Inc., Norristown, Pa., a corporation of Pennsylvania
No Drawing. Filed Mar. 2, 1964, Ser. No. 348,784
4 Claims. (Cl. 106—85)

The present invention is directed to a concrete cement composition, and more particularly to a concrete cement composition which is non-hygroscopic. In particular, the present invention is directed to an improved concrete cement composition comprising phosphoric acid and alumina.

Concrete cement compositions comprising phosphoric acid and alumina have been suggested, and have proved to be very useful. Unfortunately, these prior compositions suffer from a major failing which has seriously hindered their utility. Thus, prior concrete cement compositions formed from phosphoric acid and alumina have tended to be hygroscopic. Furthermore, these prior compositions have required an appreciable period of time, such as from overnight to 24 hours or more in which to set. This is a serious handicap in many applications, as where there is exposure to moisture after the application of the concrete cement composition, or where the concrete cement composition is used for patching. In addition, prior concrete cement compositions formed from phosphoric acid and alumina could not be readily applied using a pneumatic gun or pneumatic ram.

This invention has as an object the provision of a novel concrete cement composition comprising phosphoric acid and alumina.

This invention has as another object the provision of a concrete cement composition which is non-hygroscopic, and which will set in a relatively short period of time, such as up to about two hours.

This invention has as yet another object the provision of a novel concrete cement composition which may be applied through a pneumatic gun or pneumatic ram or the like.

Other objects will appear hereinafter.

These and other objects are accomplished by the concrete cement composition of the present invention which consists essentially of phosphoric acid, alumina, and magnesium oxide.

The phosphoric acid is used in its liquid state. The exact chemical nature of the phosphoric acid and its concentration are not critical. Thus, I have successfully used both orthophosphoric acid and polyphosphoric acid in the compositions of the present invention. Furthermore, I have used acids containing from 15 to 50 weight percent or more of water. However, the phosphoric acid should be present in the concrete cement composition of the present invention in a sufficient concentration so that from 15 to 55 weight percent of the concrete cement composition constitutes phosphorous pentoxide, namely $P_2O_5$, when the composition is quantitatively analyzed. Preferably, the amount of phosphoric acid in the concrete cement composition of the present invention should be of the order of about 33 weight percent.

The alumina should be finely divided, such as a powder sufficiently fine to pass through a 325 mesh screen. The weight percentage concentration of the alumina in the concrete cement compositions of the present invention should be between 45 to 75 weight percent, preferably in the higher portion of this weight percentage range. I have obtained optimal results with concrete cement compositions containing 55 to 57 weight percent of alumina.

The magnesium oxide should be present in the concrete cement compositions of the present invention in a weight percentage of between about 5 to 18 weight percent, and preferably about 9 weight percent. As with the alumina, the magnesium oxide used to form the concrete cement compositions of the present invention should be in a finely divided powdered state, such as sufficiently finely divided to pass through a 325 mesh screen.

The concrete cement compositions of the present invention may be dry blended to form concrete with a wide variety of aggregates. For example, castable concrete may be formed by the addition of crushed silicon carbide, silica, chromium oxide, calcined clays, tabular alumina, or mixtures of the foregoing. The concentration of these aggregates in the concrete will vary depending upon the qualities sought in the finished concrete. While the present invention is directed to the concrete cement composition rather than to the concrete, generally the concrete cement compositions of the present invention may form from 20 to 30 weight percent of the concrete with the aforesaid or similar aggregates forming the remainder. At the time of usage of the concrete, the user will add water, as in the amount of from 3 to 8 weight percent, and then cast the concrete blend. The cast concrete blend will be non-hygroscopic, and will set rapidly. While the setting time will vary depending upon the ambient temperature conditions, it will generally be less than about two hours. Concrete, of the aforesaid type, may be applied by a trowel, and also by a pneumatic gun or pneumatic ram.

The compositions of the present invention should be prepared by dry blending the magnesium oxide into a powdered composition. Thus, where the concrete cement composition of the present invention is prepared as such, the phosphoric acid and alumina may be blended, as at room temperature, with the alumina added to the liquid phosphoric acid. The resultant mixture should be dried at a temperature above 212° F. for a sufficient time to remove all moisture, such as at 230° F. for a minimum of 30 minutes. The so-dried mixture should then be pulverized or otherwise treated to produce a fine powder, as for example a powder capable of passing through a 325 mesh screen. The finely divided magnesium oxide should then be dry blended with the finely divided powder.

If desired, the phosphoric acid, alumina, and concrete aggregates, such as the aforementioned silicon carbide, silica, chromium oxide, clays, and/or ferric oxide may be blended, then dried at a temperature such as 230° F. for a minimum period of 30 minutes in order to drive off moisture, and then pulverized. The magnesium oxide may be added by dry blending to this powdered mixture, with the weight percentage of the magnesium oxide being based upon the $P_2O_5$ of the phosphoric acid, and of the alumina in the concrete cement components, as aforesaid.

By way of illustration, there is set forth below examples of the concrete cement compositions of the present invention. These examples are by way of illustration, and can be varied in accordance with the disclosure set forth above. In each instance, the concrete cement composition was prepared by dry blending finely powdered magnesium oxide into a finely powdered mixture of phosphoric acid and alumina which had previously been blended together by having the alumina added to the liquid phosphoric acid, followed by drying at a sufficient temperature and for a sufficient period of time to remove all moisture and subsequent pulverization of the dried material:

*Example 1*

A concrete cement composition derived from 50 weight percent orthophosphoric acid and containing in the final state 33 weight percent $P_2O_5$, 57 weight percent alumina, and 10 weight percent magnesium oxide.

Example 2

A concrete cement composition containing 27 weight percent $P_2O_5$ derived from 60 weight percent orthophosphoric acid, 63 weight percent alumina, 6 weight percent magnesium oxide, 3.5 weight percent silica, 0.5 weight percent ferric oxide. This concrete cement composition is derived from an alumina containing the aforesaid silica and ferric oxide impurities.

Example 3

A concrete cement composition containing 20 weight percent $P_2O_5$ derived from 75 weight percent orthophosphoric acid, 74 weight percent alumina, and 6 weight percent magnesium oxide.

Example 4

A concrete cement composition containing 45 weight percent $P_2O_5$ derived from 85 weight percent orthophosphoric acid, 49 weight percent alumina, and 6 weight percent magnesium oxide.

Example 5

A concrete cement composition containing 20 weight percent $P_2O_5$ derived from 70 weight percent orthophosphoric acid, 70 weight percent alumina, and 10 weight percent magnesium oxide.

Example 6

The concrete cement composition of Example 1 except that the $P_2O_5$ was derived from polyphosphoric acid.

It is to be observed that the concrete cement compositions of the present invention may include inert extenders, particularly in those compositions where a low weight percentage of alumina is used. However, as heretofore indicated, it is preferable to employ high weight percentages of alumina within the weight percentage range of 45 to 75 weight percent alumina. The inert extender may be co-mingled with the alumina powder as by dry blending, or the inert extender may be deposited upon the alumina. However, the inert extender, such as silica, should not react with the phosphoric acid, nor should it interfere with the reaction between the phosphoric acid and the alumina.

The present invention may be embodied in other specific forms without departing from the spirit or essential attributes thereof and, accordingly, reference should be made to the appended claims, rather than to the foregoing specification as indicating the scope of the invention.

I claim:

1. A concrete cement composition suitable for blending with aggregate to prepare rapid setting concrete which will set within about two hours to yield a non-hygroscopic cast concrete, said composition consisting essentially of a uniform blend of a mixture of a phosphate derived from phosphoric acid and from alumina, and containing from 15 to 55 weight percent of $P_2O_5$ and from 45 to 75 weight percent of alumina, and from 5 to 18 weight percent of magnesium oxide.

2. A concrete cement composition in accordance with claim 1 having from 55 to 57 weight percent of alumina.

3. A concrete cement composition in accordance with claim 1 having 9 weight percent of magnesium oxide.

4. A concrete cement composition in accordance with claim 1 having from 55 to 57 weight percent alumina and 9 weight percent magnesium oxide.

References Cited by the Examiner

UNITED STATES PATENTS

| | | | |
|---|---|---|---|
| 2,324,079 | 7/43 | Greger | 106—108.5 |
| 2,391,493 | 12/45 | Wainer et al. | 106—121 |
| 2,405,884 | 8/46 | Greger | 23—105 |
| 2,450,952 | 10/48 | Greger | 106—121 |

TOBIAS E. LEVOW, *Primary Examiner.*